ABSTRACT

United States Patent [19]
Pass et al.

[11] 3,892,555
[45] July 1, 1975

[54] HERBICIDAL AGENTS

[75] Inventors: Herbert A. Pass, Toronto, Canada;
Hans-Rudolf Gerber, Pratteln;
David Howard Green, Birsfelden,
both of Switzerland

[73] Assignee: Ciba-Geigy Corporation, Ardsley, N.Y.

[22] Filed: May 25, 1972

[21] Appl. No.: 256,953

[30] Foreign Application Priority Data
May 28, 1971 Switzerland.......................... 7847/71
Oct. 8, 1971 Switzerland....................... 14718/71

[52] U.S. Cl. ........................ 71/93; 71/105; 71/121
[51] Int. Cl.............................................. A01n 9/22
[58] Field of Search................................. 71/93, 121

[56] References Cited
UNITED STATES PATENTS

| | | | |
|---|---|---|---|
| 3,077,392 | 2/1963 | Bales...................................... | 71/93 |
| 3,152,882 | 10/1964 | Luekenbaugh ......................... | 71/93 |
| 3,634,062 | 1/1972 | Berrer et al............................. | 71/93 |
| 3,733,359 | 5/1973 | Reihen................................... | 71/121 |

*Primary Examiner*—Lewis Gotts
*Assistant Examiner*—Catherine L. Mills
*Attorney, Agent, or Firm*—Frederick H. Rabin

[57] ABSTRACT

A synergetic herbicidal effect is achieved if herbicidal 4,6-bis-(substituted amino)-s-triazines are combined with derivatives of dihalocyanophenol or with 3,5-dihalo-4-hydroxy-benzaldoxime-O-nitrophenyl-ether. Such agents are preferably used for combating weeds in cultures of cereals and maize.

4 Claims, No Drawings

HERBICIDAL AGENTS

The present invention relates to new agents and to a method of combating weeds, in particular in cultures of cereals and maize, which method comprises the use of active substance mixtures consisting of two classes of active substance which differ in their constitution.

One active substance component of the herbicidal agent is a 4,6-bis-(substituted amino)-s-triazine of the formula I

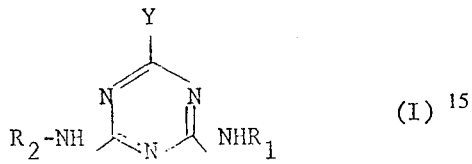

wherein Y represents a chlorine atom or the methylthio group, $R_1$ represents the ethyl, n-propyl, isopropyl, cyclopropyl, sec.butyl or tert.butyl radical and $R_2$ represents the methyl, ethyl, n-propyl, isopropyl or cyclopropyl radical or the 2-cyano-propyl-(2) radical.

The other active substance component is a cyanophenol derivative of the formula IIa

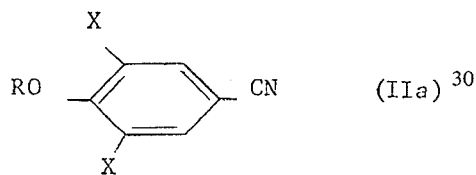

wherein X represents bromine or iodine and R represents the acid radical of a $C_1$–$C_4$ alkylcarbamic acid, or, if $R_2$ in the formula I represents the cyclopropyl radical or the 2-cyanopropyl-(2) radical, also represents hydrogen or the acid radical of an alkylcarboxylic acid containing from 2–8 carbon atoms, or the other active substance component is a 3,5-dihalogeno-4-hydroxybenzaldoxime-O-nitrophenyl ether of the formula IIb

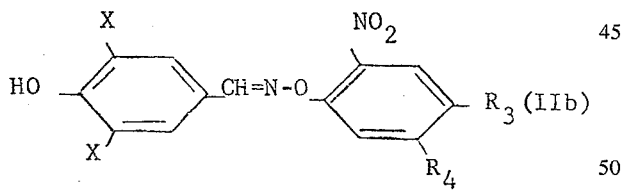

wherein X represents bromine or iodine and $R_3$ represents the nitro group, the formyl group or a dialkylsulphamoyl group containing from 2 to 6 carbon atoms and $R_4$ represents hydrogen or a chlorine atom.

In the herbicidal agents according to the invention there must always be present at least one triazine component of the formula I and at least one component of the formula IIa or IIb. In addition to the triazine component I, the mixture may also contain both an active substance of the type IIa and of the type IIb.

The s-triazine components of the formula I are manufactured in a manner known per se by reacting cyanuric chloride with 1 mole each of the corresponding amine and, if desired, with 1 mole of methylmercaptan or its alkali salt in the presence of solvents or diluents and optionally of acid binding agents.

The cyanophenol derivatives of the formula IIa are manufactured by halogenating 4-hydroxybenzonitrile and, optionally, subsequent acylation or carbamoylation with e.g. a corresponding carboxylic acid or carbamic chloride.

The compounds of the formula IIb can be manufactured e.g. by dibrominating 4-hydroxybenzaldehyde in the 3,5-position, oximising the aldehyde group and further reacting the sodium salt of the aldoximes with a chloro-nitrobenzene of the formula

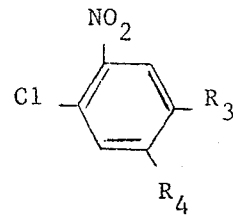

wherein $R_3$ and $R_4$ have the meanings given hereinbefore.

One or more of the following triazines of the formula I are eligible as constituents of the mixtures according to the invention:

2-chloro-4-methylamino-6-ethylamino-s-triazine,
2-chloro-4-methylamino-6-isopropylamino-s-triazine,
2-chloro-4-methylamino-6-sec.butylamino-s-triazine,
2-chloro-4-ethylamino-6-n-propylamino-s-triazine,
2-chloro-4-ethylamino-6-isopropylamino-s-triazine,
2-chloro-4-ethylamino-6-sec.butylamino-s-triazine,
2-chloro-4-methylamino-6-tert.butylamino-s-triazine,
2-chloro-4-ethylamino-6-tert.butylamino-s-triazine,
2-chloro-4-isopropylamino-6-sec.butylamino-s-triazine,
2-chloro-4-isopropylamino-6-tert.butylamino-s-triazine,
2-chloro-4,6-bis-(ethylamino)-s-triazine,
2-chloro-4,6-bis-(isopropylamino)-s-triazine,
2-chloro-4-ethylamino-6-(1',2'-dimethyl-propylamino)-s-triazine,
2-chloro-4-isopropylamino-6-cyclopropylamino-s-triazine,
2-chloro-4-ethylamino-6-(2'-cyano-propyl-2'-amino)-s-triazine,
2-chloro-4-cyclopropylamino-6-(2'-cyanopropyl-2'-amino)-s-triazine,
2-methylthio-4-methylamino-6-isopropylamino-s-triazine,
2-methylthio-4,6-bis-(ethylamino)-s-triazine,
2-methylthio-4-ethylamino-6-isopropylamino-s-triazine,
2-methylthio-4-ethylamino-6-sec.butylamino-s-triazine,
2-methylthio-4-ethylamino-6-tert.butylamino-s-triazine,
2-methylthio-4,6-bis(isopropylamino)-s-triazine,
2-methylthio-4-isopropylamino-6-sec.butylamino-s-triazine,
2-methylthio-4-isopropylamino-6-tert.butylamino-s-triazine,
2-methylthio-4-isopropylamino-6-cyclopropylamino-s-triazine,
2-methylthio-4-isopropylamino-6-(2'-cyanopropyl-2'-amino)-s-triazine, 2-methylthio-4-cyclopropylamino-6-(2'-cyanopropyl-2'-amino)-s-triazine,
2-methylio-4-ethylamino-6-(1',2'-dimethylpropylamino)-s-triazine.

Cyanophenol derivatives of the formula IIa which are preferred mixture constituents are 2,6-diiodo-4-cyanophenol, 2,6-dibromo-4-cyanophenol and the corresponding acyl derivatives, such as caprylic-(2,6-dibromo-4-cyano)-phenyl ester and methylcarbamic-(2,6-diiodo-4-cyano)-phenyl ester.

The following may be cited as preferred mixture constituents of the formula IIb (benzaldoxime-nitrophenyl ether):
the 3,5-dibromo-4-hydroxy-benzaldoxime-0-(2',4'-dinitrophenyl)-ether of the formula

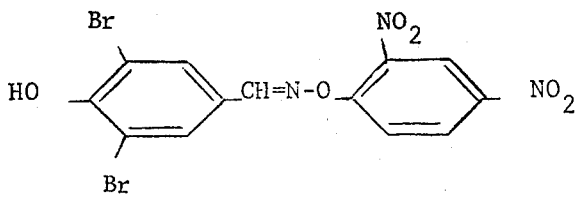

hereinafter referred to as "Bromofenoxim", also the corresponding 3,5-diiodo-4-hydroxy-benzaldoxime-0-(2',4'-dinitrophenyl)-ether and the 3,5-diiodo-4-hydroxy-benzaldoxime-0-(2'-nitro-4'-dimethylsulphamoyl-phenyl)-ether and the 3,5-dibromo-4-hydroxy-benzaldoxime-0-(2'-nitro-4'-dimethylsulphamol-phenyl)-ether. Anologous oxime ethers which in the 4-position possess another electron attracting substituent instead of the nitro, formyl or dialkylsulphamoyl group, display a similar activity.

Within the scope of the description of the present invention, by weeds are meant latifoliate weeds (dicotyledones) and various grass-like weeds (monocotyledones), e.g. those which belong to the following families:
Umbelliferae, Compositae, in particular one year old Compositae, Cruciferae, Chenopodiaceae, Rubiaceae, Solanaceae, Papaveraceae, Boraginaceae, Coryophyllaceae, Scrophyllaceae, Polygonum spp., Geranium ssp., Amaranthaceae, and Graminae of the species Panicum, Echinochloa, Digitaria, Setaria, Cynodon, Alopecurus, etc..

Such weeds seriously impede the growth of summer and winter cereals and of maize. To the present day only a limited control using conventional herbicides in acceptable rates of application has been possible. In certain cases, some weed species were kept satisfactorily under control using sensible rates of application of about 2-6 kg of active substance per hectare; but simultaneously, the growth of other weed species was retarded only to a limited extent or the weeds were scarcely attacked at all. In some cases it was possible to control weed species which are resistent to the action of certain herbicides by increasing the amount of herbicidal active substance. However, this procedure is disadvantageous since in increasing the rate of application there is the risk that the crop plants will be damaged or that large residual amounts of herbicide will be produced in the soil. In combating weeds in cultures of crop plants it is therefore desirable to develop herbicides which are effective when used in low concentrations.

The discovery has now been made that the multicomponent mixtures according to the invention of a triazine of the formula I together with an active substance of the formula IIa, but in particular of the formula IIb, are much more effective in relatively low concentrations in combating weeds, particularly in combating weeds in cereal and maize cultures than a comparison of the individual activity of the single components with comparable concentrations would lead one to expect. Mixtures which have been found to be particularly effective are those which contain as s-triazine of the formula II 2-chloro-4-ethylamino-6-isopropylamino-s-triazine (hereinafter referred to as "Atrazin") and 3,5-dibromo-4-hydroxy-benzaldoxime-0-(2',4'-dinitrophenyl)-ether (hereinafter referred to as "Bromofenoxim").

The mixtures according to the invention contain the component constituents I and II in the ratio by weight of 1:1 to 1:12, preferably 1:1 to 1:8.

The amounts used must be sufficiently large so as to produce the particular herbicidal action desired. Thus the rates of application for destroying or preventing the growth of the weeds vary depending on the particular kind of weed, on the formulation used, on the corresponding herbicidal action of the active substances, on the purpose of the application (short or long term action), on the method of application, the plant concentration, the prevailing weather conditions and other variables. It is therefore not possible to indicate rates of application which are binding for all eventualities. In general, the rate of application of active substance mixture is between 0.2 and 1.2 kg per hectare preferably between 0.25 and 0.9 kg per hectare. This mixture additionally contains carriers and/or diluents.

Using such mixtures it is possible to treat especially cultures of summer and winter cereals as well as maize cultures in zones of moderate climate after the plants have emerged, without the plants being in any way injuriously affected. It is possible to treat the culture with the mixtures according to the invention at the earliest possible moment of the growth period after the plants have germinated.

The amount of triazine component in the agents according to the invention is preferably 8 to 50% by weight and that of the other component of type II is 92 to 50% by weight of the total amount of active substance. Both the cited types of active substance can be processed together with various conditioning agents and additives to form agents which contain the active substances in herbicidally active amounts. Normally not less than 1% of active substance is used in dusts, whereas the content of active substance in wettable powders or solutions may be 80 or 90%.

The herbicidal agents according to the invention may be mixed with suitable additives or dispersing agents to form solutions, dusts, wettable powders and aqueous dispersions or emulsions. They may thus be used with a carrier or diluent, e.g. a finely divided solid, an aqueous solution of materials of organic origin, water, a wetting agent, a dispersing agent, an emulsifying agent or suspension agent, an aqueous emulsion or any desired combination of all these agents. The wetting agents, dispersing agents, emulsifying and suspension agents are usually comprised under the collective term "surfactants." Such surfactants may be anionic, cationic or non-ionogenic substances which are known in many varieties. In the manufacture of the agents according to the invention the surfactants are usually employed in a concentration of between 1 and 10% by weight.

In accordance with the use for which they are intended, the agents according to the invention are applied in the form of solutions, emulsions, suspensions or dusts. All applications forms however must contain the active substances in finely divided form. For the selective prevention of plant growth, particularly selective weed control, the use of inert carriers is preferred to those carriers which are themselves phytotoxic.

Dusts and other solid compositions are obtained by intimately mixing and grinding the active substances with inert solid carriers, e.g. talcum, diatomaceous earth, china clay, bentonite, calcium carbonate, limestone, boric acid, dolomite, precipitated silicic acid, alkaline earth metal silicates, feldspar, mica, tricalcium phosphate and sawdust, powdered cork, clay, bark meal, cellulose powder, charcoal and other materials of vegetable origin. Each of these carriers may be used singly or in admixture with each other. The particle size of the carriers for dusts is advantageously up to about 0.1 mm, for tracking agents between 0.075 to 0.2 mm and for granules from 0.2 mm to 1 mm more. The carriers may, however, also be impregnated with the active substances by means of a volatile solvent. Dusts and pastes can be suspended in water by adding wetting agents and protective colloids and so used as sprays.

Liquid concentrates for aqueous emulsions and wettable powders for aqueous suspensions may also be prepared from liquid and from solid active substances. Liquid or solid active substances, however, are only more suitable for manufacturing liquid concentrates or wettable powders of higher concentrations. The various application forms may be adapted to the intended purpose in the conventional manner by adding substances which improve the distribution, the adhesion properties, the resistance to rain and possibly also the absorption. Such substances are in particular the surfactants cited hereinbefore. Likewise it is possible to increase and broaden the biological action by adding substances having bactericidal or fungicidal properties or of other active substances which influence the plant growth, as well as by adding fertilisers.

The process according to the invention of combating weeds consists preferably in treating an area infested with weeds with effective amounts of an agent which contains the active substances of the formula I and the formula II in the ratio by weight of 1:1 to 1:12, preferably 1:2 to 1:8.

The herbicidal agent can be applied to the locus or to the area which is to protected from weeds in the form of a spray, a powder or dust. The agent is applied directly to the locus or to the area which is already infested with weeds. The agents may thus be applied to the leaves in the form of a spray. On the other hand, the dry agents in powder form may be scattered directly on to the plants.

The 50% wettable powders used for the tests described hereinbelow for detecting the synergistic herbicidal action have the following composition:

Atrazin — 50% wettable powder
  50 parts of Atrazin
  5 parts of sodium dibutylnaphthyl sulphonate
  3 parts of naphthalenesulphonic acid/phenolsulphonic acid/formaldehyde condensate 3:2:1
  42 parts of Champagne chalk Bromofenoxim — 50% wettable powder
  50 parts of Bromofenoxim
  5 parts of silicic acid
  3.5 parts of octylphenol-octaglycol ether
  0.5 parts of oleic acid
  2 parts of sodium alkylsulphate
  39 parts of bolus alba The following advantageous formulations are cited as additional examples.

Granules

The following substances are used to manufacture 5% granules:
  4 parts of Bromofenoxim
  1 part of Atrazin
  0.25 parts of epichlorohydrin
  0.25 parts of cetylpolyglycol ether
  3.50 parts of polyethylene glycol
  91 parts of china clay (particle size: 0.3–0.8 mm)

The active substances are mixed with epichlorohydrin and the mixture is dissolved in 6 parts of acetone. Then polyethylene glycol and cetylpolyglycol ether are added. The resulting solution is sprayed on china clay and then evaporated in vacuo.

Wettable powders

The following constituents are used to manufacture (a) a 50%, (b) a 25% and (c) a 10% wettable powder:

a. 40 parts of Bromofenoxim
   10 parts of 2-chloro-4-ethylamino-6-tert.butylamino-s-triazine
   5 parts of sodium dibutyl naphthyl sulphonate
   3 parts of naphthalenesulphonic acid/phenolsulphonic acid/formaldehyde condensate 3:2:1
   20 parts of china clay
   2 parts of Champagne chalk;

b. 20 parts of 3,5-diiodo-4-hydroxybenzaldoxime-(2',4'-dinitro-5'-chlorophenyl)-ether
   5 parts of 2-methylthio-4,6-bis(ethylamino)-s-triazine
   5 parts of oleylmethyl tauride (sodium salt)
   2.5 parts of naphthalenesulphonic acid/formaldehyde condensate
   0.5 part of carboxymethyl cellulose
   5 parts of neutral potassium aluminium silicate
   62 parts of china clay;

c. 10 parts of 3,5-dibromo-4-hydroxybenzaldoxime-(2',4'-dinitrophenyl)-ether
   1 part of 2-methylthio-4-ethylamino-6-tert.butylamino-s-triazine
   3 parts of a mixture of the sodium salts of saturated fatty alcohol sulphates
   5 parts of naphthalenesulphonic acid/formaldehyde condensate
   81 parts of china clay.

Paste

The following substances are used to manufacture a 45% paste:
  40 parts of 2,6-dibromo-4-cyanophenol
  5 parts of 2-chloro-4-isopropylamino-6-cyclopropylamino-s-triazine
  5 parts of sodium aluminium silicate
  14 parts of cetylpolyglycol ether with 8 moles of ethylene oxide
  1 part of oleylpolyglycol ether with 5 moles of ethylene oxide
  2 parts of spindle oil 10 parts of polyethylene glycol
25 parts of water.

The active substance is intimately mixed with the additives in appropriate devices and ground. A paste is obtained which may be diluted with water to yield suspensions of any desired concentration.

Emulsion concentrate

To manufacture an emulsion concentrate (25%)
20 parts of caprylic-(2,6-dibromo-4-cyanophenyl)-ester
5 parts of 2-chloro-4-ethylamino-6-(2'-cyanopropyl-2'-amino)-s-triazine
5 parts of a mixture of nonylphenolpolyoxyethylene and calcium-dodecylbenzene-sulfonate
35 parts of 3,5,5-trimethyl-2-cyclohexene-1-one,
35 parts of dimethyl formamide
are mixed together. This concentrate may be diluted with water to yield emulsions of appropriate concentrations.

Instead of the respective active substance indicated in the above formulation examples it is also possible to use one or other of the compounds comprised by formula I and formula II.

The following tests were carried out to determine the synergistic and selective herbicidal activity of the mixtures according to the invention.

Post-emergence method

1. The following test plants were sown in a greenhouse: wheat as crop plant and *Lolium perenne, Alopecurus myosuroides, Bromus tect.* and *Setaria italica* as grass-like weeds. After the emergence of the plants (3 to 4 leaf stage) they were sprayed with the corresponding active substance or corresponding active substance mixture (I:II in the weight ratio 1:4) in the form of an aqueous dispersion (obtained from a 50% wettable powder). The evaluation of the activity produced on the germinated plants took place 11 and 14 days after the application. During the test the plants were kept uniformly moist. The prevailing temperature in the greenhouse was from about 22°C to 25°C and the relative humidity from 60% to 70%.

In this test and those which follow, the herbicidal action was rated according to the following scale:
9 : no damage
 (growth as control plants)
8–5 : slight to medium damage
 (increase in the reversible phytotoxic symptoms)
4–2 : severe damage
 (increase in the irreversible phytotoxic effects)
- : not tested The following active substances of the formulae I and II were tested singly and in admixture:
IA = Atrazin = 2-chloro-4-ethylamino-6-isopropylamino-s-triazine
IB = 2-chloro-4-isopropylamino-6-cyclopropylamino-s-triazine
IC = 2-chloro-4-ethylamino-6-(2'-cyanopropyl-2'-amino)-s-triazine
ID = Simazin = 2-chloro-4,6-bis-(ethylamino)-s-triazine
IE = 2-chloro-4-cyclopropylamino-6-(2'-cyanopropyl-2'-amino)-s-triazine
IF = 2-chloro-4-ethylamino-6-tert.butylamino-s-triazine
IG = 2-methylthio-4-isopropylamino-6-tert.butylamino-s-triazine
IIA = Bromofenoxim = 3,5-dibromo-4-hydroxybenzaldoxime-(2',4'-dinitrophenyl)-ether
IIB = 3,5-diiodo-4-hydroxybenzaldoxime-(2'-nitro-4'-formylphenyl)-ether
IIC = methylcarbamic-(2,6-diiodo-4-cyanophenyl)-ester
IID = 3,5-diiodo-4-hydroxybenzaldoxime-(2'-nitro-4'-dimethylsulphamoylphenyl)-ether
IIE = 3,5-diiodo-4-hydroxybenzaldoxime-2',4'-dinitro-5-chlorophenyl)-ether The following results were attained using a total rate of application of a maximum 400 g of active substance per hectare:

| Active Substances | Rate of application in gram/hectare | Evaluation after days | Wheat | Avena fatua | Lolium | Alopecurus | Bromus | Setaria |
|---|---|---|---|---|---|---|---|---|
| IIA | 400 | | 6 | 5 | 6 | 3 | — | — |
| IG | 100 | | 6 | 5 | 4 | 4 | — | — |
| IIA | 320 | 14 | 8 | 5 | 5 | 4 | — | — |
| IG | 80 | | 7 | 4 | 5 | 4 | — | — |
| IIA+IG | 320+80 | | 8 | 2 | 2 | 1 | — | — |
| | | | | | | | | |
| IIA | 400 | | 8 | 6 | 4 | 3 | 6 | 3 |
| IC | 100 | | 7 | 3 | 4 | 4 | 5 | 2 |
| IIA | 320 | 14 | 9 | 7 | 6 | 3 | 7 | 3 |
| IC | 80 | | 7 | 3 | 4 | 3 | 5 | 3 |
| IIA+IC | 320+80 | | 8 | 1 | 2 | 2 | 3 | 1 |
| | | | | | | | | |
| IIA | 400 | | 7 | 6 | 4 | 3 | 7 | — |
| ID | 100 | | 8 | 4 | 3 | 6 | 7 | — |
| IIA | 320 | 14 | 7 | 7 | 5 | 4 | 8 | — |
| ID | 80 | | 8 | 4 | 4 | 6 | 6 | — |
| IIA+IC | 320+80 | | 7 | 2 | 2 | 2 | 3 | — |
| | | | | | | | | |
| IIA | 400 | | 8 | 6 | 4 | 3 | 6 | 4 |
| IF | 100 | | 6 | 3 | 6 | 6 | 5 | 8 |
| IIA | 320 | 11 | 9 | 6 | 6 | 4 | 7 | 4 |
| IF | 80 | | 6 | 3 | 5 | 7 | 5 | 8 |
| IIA+IF | 320+80 | | 7 | 1 | 2 | 2 | 3 | 2 |

| Active substances | Rate of application in gram/hectare | Evaluation after days | Wheat | Avena fatuna | Lolium | Alopecurus | Bromus | Setaria |
|---|---|---|---|---|---|---|---|---|
| IIA | 200 | | 8 | 7 | 7 | 4 | 7 | 4 |
| IB | 50 | | 8 | 5 | 7 | 6 | 5 | 3 |
| IIA | 160 | 11 | 9 | 8 | 7 | 6 | 6 | 5 |
| IB | 40 | | 8 | 6 | 7 | 6 | 5 | 6 |
| IIA+IB | 160+40 | | 8 | 3 | 3 | 3 | 4 | 2 |
| IIA | 200 | | 8 | 7 | 6 | 4 | 7 | 5 |
| IC | 50 | | 8 | 5 | 5 | 6 | 7 | 3 |
| IIA | 160 | 11 | 9 | 7 | 7 | 4 | 8 | 5 |
| IC | 40 | | 8 | 5 | 5 | 6 | 8 | 5 |
| IIA+IC | 160+40 | | 8 | 2 | 3 | 2 | 4 | 2 |
| IIA | 200 | | 8 | 8 | 7 | 4 | 8 | 6 |
| ID | 50 | | 9 | 5 | 5 | 4 | 6 | 8 |
| IIA | 160 | 14 | 8 | 8 | 7 | 5 | 8 | 6 |
| ID | 40 | | 9 | 6 | 5 | 4 | 6 | 8 |
| IIA+ID | 160+40 | | 9 | 3 | 3 | 2 | 3 | 3 |
| IIA | 200 | | 8 | 8 | 7 | 7 | 7 | — |
| IE | 50 | | 7 | 5 | 4 | 4 | 5 | — |
| IIA | 160 | 14 | 8 | 8 | 7 | 8 | 8 | — |
| IE | 40 | | 7 | 5 | 4 | 4 | 5 | — |
| IIA+IE | 160+40 | | 7 | 3 | 2 | 2 | 4 | — |

| Active Substances | Rate of application in gram/hectare | Evaluation after days | Wheat | Avena fatuna | Lolium | Alopecurus | Bromus | Setaria |
|---|---|---|---|---|---|---|---|---|
| IIA | 200 | | 8 | 7 | 6 | 4 | 7 | 4 |
| IF | 50 | | 6 | 4 | 6 | 4 | 6 | 8 |
| IIA | 160 | 11 | 8 | 7 | 7 | 5 | 8 | 6 |
| IF | 40 | | 7 | 4 | 6 | 4 | 6 | 8 |
| IIA+IF | 160+40 | | 7 | 2 | 3 | 2 | 4 | 2 |
| IIA | 200 | | 8 | 8 | 6 | 6 | — | — |
| IG | 50 | | 7 | 8 | 4 | 5 | — | — |
| IIA | 160 | 14 | 7 | 6 | 8 | 6 | — | — |
| IG | 40 | | 8 | 8 | 7 | 5 | — | — |
| IIA IG | 160+40 | | 8 | 2 | 2 | 2 | — | — |

Post-emergence method

2. The following test plants were sown in a greenhouse: wheat as crop plant and *Lolium perenne*, *Alopecurus myosuroides*, *Bromus tect*. and *Setaria italica* as grass-like weeds. After the emergence of the plants (3 to 4 leaf stage) they were sprayed with the corresponding active substance or corresponding active substance mixture (I:II in the weight ratio 1:4) in the form of an aqueous dispersion (obtained from a 50% wettable powder). The evaluation of the activity produced on the germinated plants took place 11 and 14 days after the application. During the test the plants were kept uniformly moist. The prevailing temperature in the greenhouse was from about 22°C to 25°C and the relative humidity from 60% to 70%.

The following results were attained using a total rate of application of a maximum of 200 g of active substance per hectare:

| Active substances | Rate of application in gram/hectare | Evaluation after days | Wheat | Avena fatua | Lolium | Alopecurus | Bromus | Setaria |
|---|---|---|---|---|---|---|---|---|
| IIB | 200 | | 9 | 4 | 2 | 3 | 4 | — |
| IA | 50 | | 7 | 3 | 3 | 3 | 5 | — |
| IIB | 160 | 11 | 9 | 4 | 3 | 3 | 4 | — |
| IA | 40 | | 8 | 5 | 3 | 3 | 4 | — |
| IIB IA | 160+40 | | 7 | 1 | 1 | 2 | 1 | — |
| IIC | 200 | | 9 | 7 | 3 | 4 | 7 | 9 |
| IA | 50 | | 6 | 7 | 4 | 4 | 7 | 6 |
| IIC | 160 | 11 | 9 | 8 | 3 | 5 | 6 | 9 |
| IA | 40 | | 7 | 7 | 4 | 5 | 7 | 7 |
| IIC+IA | 160+40 | | 8 | 2 | 2 | 3 | 4 | 1 |
| IID | 200 | | 9 | 4 | 3 | 3 | 4 | 8 |
| IA | 50 | | 6 | 7 | 4 | 3 | 7 | 9 |
| IID | 160 | 11 | 9 | 6 | 3 | 3 | 4 | 8 |
| IA | 40 | | 7 | 7 | 3 | 3 | 8 | 9 |
| IID+IA | 160+40 | | 8 | 1 | 1 | 2 | 2 | 4 |
| IIE | 200 | | 9 | 6 | — | 4 | 6 | 5 |
| IA | 50 | | 8 | 4 | 4 | 2 | 7 | 6 |
| IIE | 160 | 11 | 9 | 6 | 3 | 3 | 6 | 4 |
| IA | 40 | | 8 | 5 | 3 | 3 | 7 | 7 |
| IIE+IA | 160+40 | | 8 | 1 | 1 | 1 | 2 | 2 |

3. Summer wheat was sown in seed beds prepared with argillaceous earth rich in humous. The autochthonous weed flora comprising the following varieties

*Polygonum convolvulus*
*Sonchus olereaceus*
*Chenopodium album*
*Amaranthus retroflexus*
*Brassica Kaber (Salsola kali)* developed until the emergence of the wheat to the 5 to 6 leaf stage.

The individual active substances and the active substance mixtures in the form of aqueous dispersions (obtained from 50% wettable powders) were sprayed on to the lots. The test was evaluated 8 weeks after the application of the active substances.

The following table indicates the herbicidal action of the individual components and of the mixtures in percent. The values represent average values of 4 test lots.

| Active Substances | Rate of application in kg/ha | Herbicidal Action in % |
|---|---|---|
| Atrazin | 0,07 | 0 |
|  | 0,14 | 0 |
|  | 0,28 | <50% |
| Bromofenoxim | 0,35 | <50% |
|  | 0,42 | <50% |
| Atrazin: Bromofenoxim 1:2 | 0,14 : 0,28 | 100% |
| Atrazin: Bromofenoxim 1:3 | 0,14 : 0,42 | 98% |
| Atrazin: Bromofenoxim 1:6 | 0,07 : 0,42 | 95% |
| Atrazin: Bromofenoxim 4:5 | 0,28 : 0,35 | 100% |

The crop plants displayed no injurious effects from the application of the active substances according to the invention but an increase in crop yield of up to about 80%.

We claim:

1. A herbicidal agent comprising a herbicidally effective amount of a mixture of 2-chloro-4-ethylamino-6-isopropylamino-s-triazine and 3,5-dibromo-4-hydroxybenzaldoxime-(2',4'-dinitrophenyl)-ether, the weight ratio of the 2-chloro-4-ethylamino-6-isopropylamino-s-triazine and the 3,5-dibromo-4-hydroxybenzaldoxime-(2',4'-dinitrophenyl)-ether being from 1:1 to 1:8.

2. An agent according to claim 1 in which the weight ratio of 2-chloro-4-ethylamino-6-isopropylamino-s-triazine and 3,5-dibromo-4-hydroxybenzaldoxime-(2',4'-dinitrophenyl)-ether is from 1:2 to 1:8.

3. A herbicidal agent comprising a herbicidally effective amount of a mixture of 2-chloro-4-ethylamino-6-tert.butylamino-s-triazine and 3,5-dibromo-4-hydroxybenzaldoxime-(2',4'-dinitrophenyl)-ether, the weight ratio of the two 2-chloro-4-ethylamino-6-tert.butylamino-s-triazine to the 3,5-dibromo-4-hydroxybenzaldoxime-(2',4'-dinitrophenyl)-ether being from 1:2 to 1:8.

4. A herbicidal agent comprising a herbicidally effective amount of a mixture of 2-methylthio-4-isopropylamino-6-tert.butylamino-s-triazine and 3,5-dibromo-4-hydroxybenzaldoxime-(2',4'-dinitrophenyl)-ether, the weight ratio of the 2-methylthio-4-isopropylamino-6-tert.butylamino-s-triazine and the 3,5-dibromo-4-hydroxybenzaldoxime-(2',4'-dinitrophenyl)-ether being from 1:2 to 1:8.

* * * * *